United States Patent
Yang et al.

(10) Patent No.: US 12,202,151 B2
(45) Date of Patent: Jan. 21, 2025

(54) METHOD FOR CORRECTING ROBOT

(71) Applicant: CHANGXIN MEMORY TECHNOLOGIES, INC., Hefei (CN)

(72) Inventors: Jun Yang, Hefei (CN); Chunhu Ren, Hefei (CN); Le Tian, Hefei (CN); Liuguang Wang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 290 days.

(21) Appl. No.: 17/668,676

(22) Filed: Feb. 10, 2022

(65) Prior Publication Data

US 2022/0379482 A1 Dec. 1, 2022

Related U.S. Application Data

(63) Continuation of application No. PCT/CN2021/120579, filed on Sep. 26, 2021.

(30) Foreign Application Priority Data

May 27, 2021 (CN) .......................... 202110583355.8

(51) Int. Cl.
  *B25J 9/16* (2006.01)
  *B65G 47/90* (2006.01)

(52) U.S. Cl.
  CPC ............ *B25J 9/1692* (2013.01); *B65G 47/90* (2013.01)

(58) Field of Classification Search
  CPC ............. B32B 2457/14; B23K 2101/40; B25J 11/0095; B25J 9/1692; B65G 47/90; G05B 2219/39557; G05B 2219/45031; G05B 2219/45032; G05B 2219/50132
  USPC ........................................................ 700/254
  See application file for complete search history.

(56) References Cited

U.S. PATENT DOCUMENTS

| | | | |
|---|---|---|---|
| 8,224,607 B2 | 7/2012 | Sakhare | |
| 8,688,398 B2 | 4/2014 | Sakhare | |
| 10,056,282 B2 | 8/2018 | Xu | |
| 2009/0062959 A1* | 3/2009 | Sakhare | H01L 21/67742 700/254 |
| 2012/0271590 A1 | 10/2012 | Sakhare | |
| 2013/0325179 A1* | 12/2013 | Liao | B25J 9/1697 700/254 |
| 2017/0194183 A1 | 7/2017 | Xu | |
| 2022/0367223 A1* | 11/2022 | Taoda | H01L 21/68 |

FOREIGN PATENT DOCUMENTS

| | | |
|---|---|---|
| CN | 101537617 A | 9/2009 |
| CN | 102017121 B | 1/2013 |
| CN | 102956436 A | 3/2013 |
| CN | 103646904 A | 3/2014 |

(Continued)

*Primary Examiner* — Adam R Mott
*Assistant Examiner* — Joseph Anthony Trias
(74) *Attorney, Agent, or Firm* — Syncoda LLC; Feng Ma

(57) ABSTRACT

A method for correcting a robot is provided. The method includes: providing a correction device, wherein the correction device comprises a jig wafer; grabbing and/or transferring the jig wafer by using the robot to obtain collected data; determining, based on the collected data, whether the robot needs to be corrected; and in response to that the robot needs to be corrected, obtaining a compensation value according to the collected data, and correcting the robot based on the compensation value.

15 Claims, 23 Drawing Sheets

(56) References Cited

FOREIGN PATENT DOCUMENTS

| | | |
|---|---|---|
| CN | 205881886 U | 1/2017 |
| CN | 113305841 A | 8/2021 |
| JP | 2007080960 A | 3/2007 |
| KR | 100725933 B1 | 6/2007 |

* cited by examiner

METHOD FOR CORRECTING ROBOT

CROSS-REFERENCE TO RELATED APPLICATIONS

This application is a continuation of International Application No. PCT/CN2021/120579, filed on Sep. 26, 2021, which is based upon and claims priority to Chinese Patent Application No. 202110583355.8, filed on May 27, 2021 in China Patent Office and entitled "METHOD FOR CORRECTING ROBOT". The contents of International Application No. PCT/CN2021/120579 and Chinese Patent Application No. 202110583355.8 are hereby incorporated by reference in their entireties.

BACKGROUND

In the technical field of semiconductors, a wafer needs to be transferred in different chambers to implement different processing processes (such as an etching process and a deposition process) on the wafer. Generally, a robot is used to transfer the wafer. A common robot includes a Vacuum transmission module robot (VTM robot) or an Air transmission module robot (ATM robot).

Before using a robot to transfer a wafer, it is often necessary to correct the transfer accuracy of the robot to prevent the robot from damaging the wafer during the transfer process.

Conventional methods for correcting a robot are generally that an operator uses an external handle and a correction jig to calibrate the positions that a robot moving to the respective chambers or airlock during a robot correction process. Since the placement of the jig and the use of the handle are both completed manually, it is inevitable that there will be operational errors, resulting in additional loss. In addition, due to the need to open the chambers when placing and taking out the jig, a lot of machine restart work is required after the completion of calibration, which increases the downtime of the machine.

SUMMARY

The disclosure relates to the field of semiconductor device technologies, and particularly, to a method for correcting a robot.

In an aspect, the disclosure provides a method for correcting a robot. The method includes: providing a correction device, herein the correction device includes a jig wafer; grabbing and/or transferring the jig wafer to obtain collected data by using the robot; determining, based on the collected data, whether the robot needs to be corrected; and in response to that the robot needs to be corrected, obtaining a compensation value according to the collected data, and correcting the robot based on the compensation value.

BRIEF DESCRIPTION OF THE DRAWINGS

To describe the technical solutions in the embodiments of the disclosure or in conventional technologies more clearly, the following briefly introduces the accompanying drawings required for describing the embodiments or the conventional technologies. It is apparent that the accompanying drawings in the following description illustrate only some embodiments of the disclosure, and a person of ordinary skilled in the art may still derive other accompanying drawings from these accompanying drawings without involving any inventive efforts.

DETAILED DESCRIPTION

Figure 1:
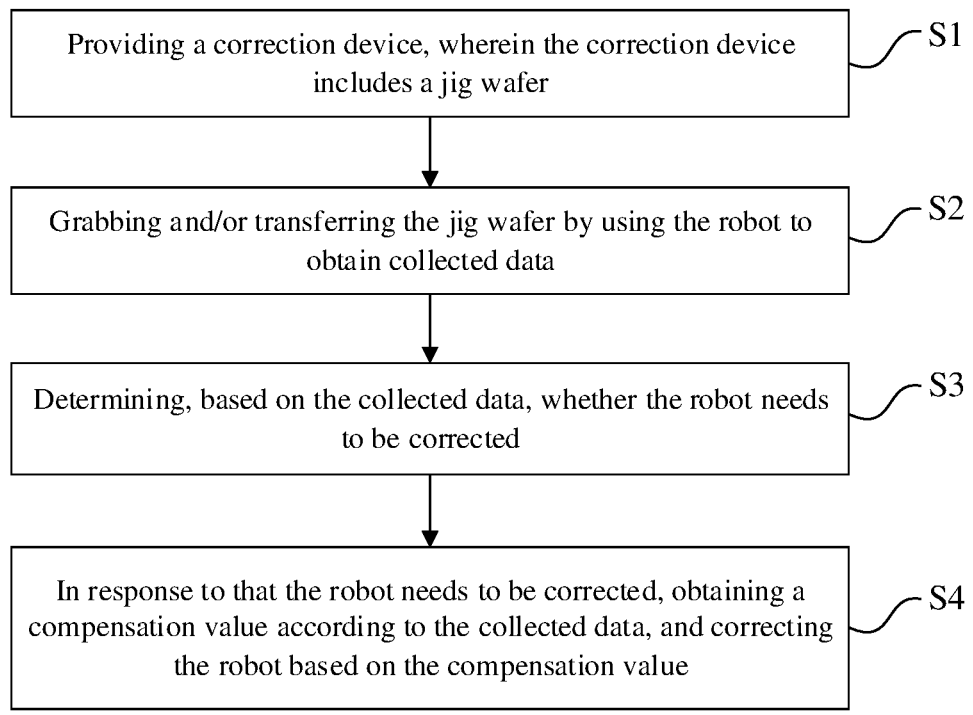
FIG. 1 is a flowchart of a method for correcting a robot according to an embodiment of the disclosure.

In order to facilitate understanding of the disclosure, a more comprehensive description of the disclosure is made below with reference to the related accompanying drawings. Preferred embodiments of the disclosure are given in the accompanying drawings. However, the present disclosure may be implemented in various forms, but is not limited to the embodiments described herein. Instead, these embodiments are provided for the purpose of making the disclosure more thorough and comprehensive.

Unless otherwise defined, meanings of all technical and scientific terms used in this description are the same as those usually understood by a person skilled in the art to which the disclosure belongs. Herein, the terms used in the description of the disclosure are merely for the purpose of describing specific embodiments, but are not intended to limit the disclosure.

It is to be understood that when an element or a layer is referred to as being "on", "beneath" or "connected to" another element or layer, the element or layer can be directly on, directly beneath or directly connected to another element or layer, or an intervening element or layer may also be present. Conversely, when an element is referred to as being "directly on", "directly beneath" or "directly connected to" another element or layer, no intervening element or layer may be present. It is to be understood that although the terms "first" or "second" etc. may be used herein to describe various elements, components, areas, layers, doping types and/or portions, these elements, components, areas, layers, doping types and/or portions should not be limited by these terms. These terms are only used to distinguish one element, component, area, layer, doping type or portion from another element, component, area, layer, doping type or portion. Thus, a first element, component, area, layer, doping type or portion discussed below can be represented as a second element, component, area, layer, doping type or portion without departing from the teachings of the disclosure. For example, a first jig wafer can be referred to as a second jig wafer, and similarly, the second jig wafer can be referred to as the first jig wafer. The first jig wafer and the second jig wafer are different jig wafers.

Spatially relative terms such as "beneath", "below", "lower", "under", "above", "upper", etc., can be used herein to describe one element or feature's relationship to another element(s) or feature(s) as illustrated in the drawings. It is to be understood that spatially relative terms may be intended to encompass different orientations of the device in use or operation in addition to the orientation depicted in the drawings. For example, if the device in the drawings is turned over, elements described as "below", "under" or "beneath" other elements or features would then be oriented "above" other elements or features. Thus, the exemplary terms "below" and "beneath" can encompass both an orientation of above and below. Furthermore, the device may also be otherwise oriented (for example, rotated 90 degrees or at other orientations) and the spatially relative descriptors used herein interpreted accordingly.

As used herein, the singular forms "a", "an" and "said/the" may include the plural forms as well, unless the context clearly indicates otherwise. It is also to be understood that, when the terms "consist of" and/or "include" are used in the description, the presence of stated features, integers, steps, operations, elements, and/or components can be determined, but the presence or addition of one or more other features, integers, steps, operations, elements, components, and/or groups thereof is not precluded. Moreover, as used herein, the term "and/or" includes any and all combinations of the associated listed items.

Referring to FIG. 1, the disclosure provides a method for correcting a robot. The method includes steps S1 to S4.

At S1, a correction device is provided. Herein the correction device includes a jig wafer.

At S2, the jig wafer is grabbed and/or transferred by using the robot to obtain collected data.

At S3, it is determined that whether the robot needs to be corrected based on the collected data.

At S4, in response to that the robot needs to be corrected, a compensation value is obtained according to the collected data, and the robot is corrected based on the compensation value.

According to the method for correcting a robot provided by the disclosure, the collected data can be automatically acquired during a wafer transferring process, and when the robot needs to be corrected, a compensation value can be obtained according to the collected data, and then the robot can be corrected based on the compensation value. No manual operation with an external handle and a correction jig is required, the risk of misoperation caused by manual calibration can thus be avoided and additional loss caused by the misoperation can be reduced, thereby improving the accuracy of a robot correction process. Moreover, according to the method for correcting a robot provided by the disclosure, the correction can be completed without opening the chambers, and there is no need to restart the machine after the correction is completed, which can effectively reduce the downtime of the machine and improve the working efficiency of the machine.

Figure 2:
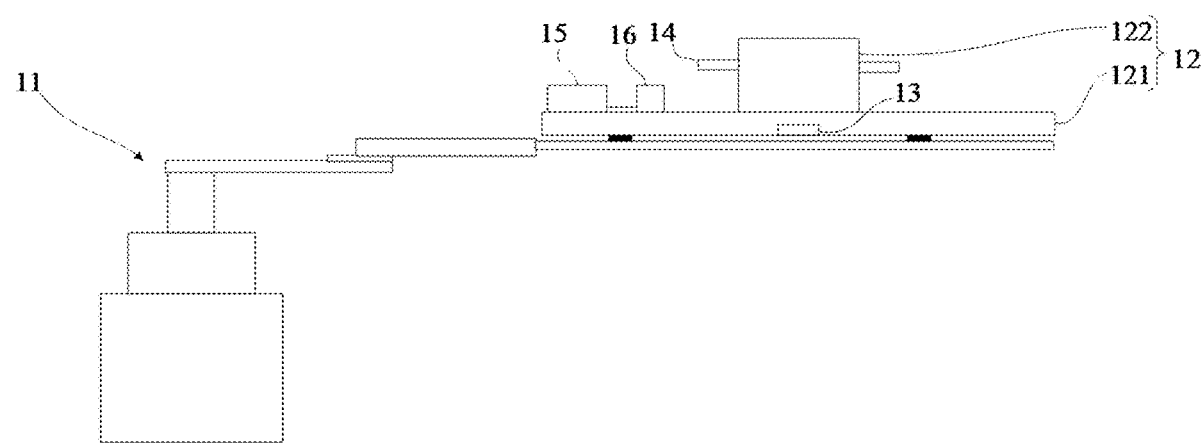
FIG. 2 is a schematic structural diagram of a first robot carrying a first jig wafer in a method for correcting a robot according to an embodiment of the disclosure.

Referring to FIG. 2, in an embodiment, the robot may include a first robot 11 located in a first chamber. The jig wafer may include a first jig wafer 12. The first jig wafer 12 may include a first wafer body 121, a first jig 122, and a first distance measuring sensor 13. The first jig 122 may be located on a front surface of the first wafer body 121, and the first distance measuring sensor 13 may be located at a central position of a back surface of the first wafer body 121.

Optionally, the first chamber may include, but is not limited to, an atmospheric transmission chamber, a vacuum chamber, an airlock chamber, a buffer chamber, a cooling chamber, or a process chamber, etc. The type of the first chamber is not limited in the disclosure.

Optionally, the first distance measuring sensor 13 can be configured to detect whether a center of the first jig wafer 12 is aligned with a center of a wafer chuck 17.

Figure 3:
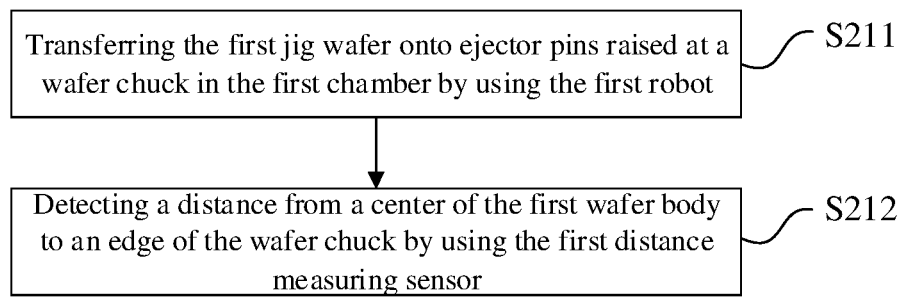
FIG. 3 is a flowchart of step S2 in a method for correcting a robot according to an embodiment of the disclosure.
Figure 4:
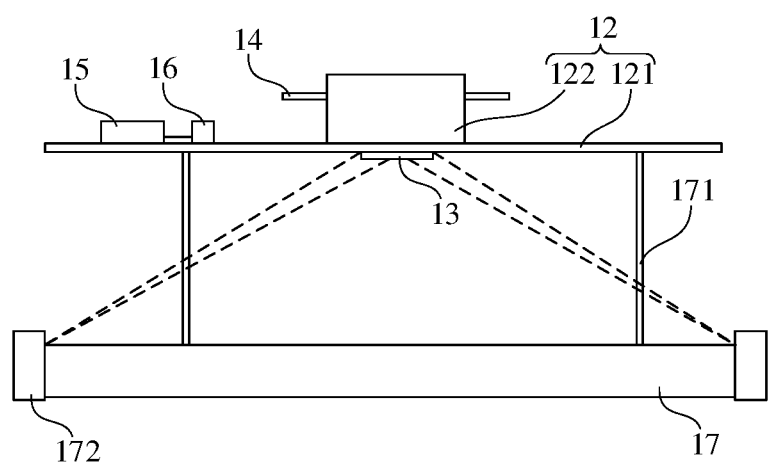
FIG. 4 is a schematic diagram of detecting by using a first distance measuring sensor after a first jig wafer is placed on ejector pins in step S211 in a method for correcting a robot according to an embodiment of the disclosure.

Referring to FIG. 3 and FIG. 4, in one of the embodiments, step S2 may include steps S211 and S212.

At S211, the first jig wafer 12 is transferred onto ejector pins 171 raised at the wafer chuck 17 in the first chamber by using the first robot 11.

At S212, a distance from the center of the first wafer body 121 to an edge of the wafer chuck 17 is detected by using the first distance measuring sensor 13.

Optionally, in step S211, several ejector pins 171 may be provided at the wafer chuck 17. When the first jig wafer 12 is transferred to a position above the wafer chuck 17, the ejector pins 171 are raised to support the first jig wafer 12. After the ejector pins 171 are lowered and returned to the positions thereof, the first jig wafer 12 is placed on an upper surface of the wafer chuck 17, so that the first jig wafer 12 is sucked on the wafer chuck 17.

Optionally, in step S212, as illustrated in FIG. 4, the edge of the wafer chuck 17 may be provided with an edge ring 172. The edge ring 172 may include, but is not limited to, a metal ring. When the first distance measuring sensor 13 is located on the central position of the back surface of the first wafer body 121, the first distance measuring sensor 13 can acquire the distance from the center of the first wafer body 121 to the edge of the wafer chuck 17 by detecting a distance from the edge ring 172 to the first distance measuring sensor 13.

In an embodiment, the wafer chuck 17 may include, but is not limited to, an electrostatic chuck or a vacuum chuck, etc. The type of the wafer chuck 17 is not limited in the disclosure.

In an embodiment, step S3 may include the following step:

comparing the detected distance from the center of the first wafer body 121 to the edge of the wafer chuck 17 with a target distance, and when a deviation between the detected distance from the center of the first wafer body 121 to the edge of the wafer chuck 17 and the target distance is outside a first preset range, determining that the first robot 11 needs to be corrected.

Specifically, in an embodiment, the distances from the first distance measuring sensor 13 to the points on two opposite sides of the edge ring 172 can be detected. If the two distances to the two sides are different, it can be determined that the center of the first jig wafer 12 is not aligned with the center of the wafer chuck 17, and the position of the first robot 11 needs to be adjusted.

Figure 5:
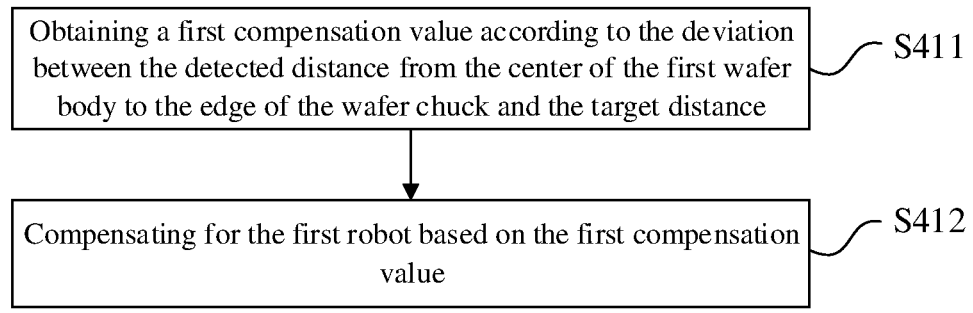
FIG. 5 is a flowchart of step S4 in a method for correcting a robot according to an embodiment of the disclosure.

Referring to FIG. 5, in an embodiment, step S4 may include steps S411 and S412.

At S411, a first compensation value is obtained according to the deviation between the detected distance from the center of the first wafer body 121 to the edge of the wafer chuck 17 and the target distance.

At S412, the first robot 11 is compensated based on the first compensation value.

Referring to FIG. 2 and FIG. 4, in an embodiment, the first jig wafer 12 further includes a driving device 16.

In an embodiment, when a deviation exists between the detected distance from the center of the first wafer body 121 to the edge of the wafer chuck 17 and the target distance, and the deviation is within the first preset range, step S4 may further include the following step:

driving the first jig 122 by using the driving device 16 to move the first wafer body 121.

Specifically, referring to FIG. 2, in an embodiment, the first robot 11 may include a first control device 15. The first control device 15 is connected to the first distance measuring sensor 13, and is configured to send a control signal when a deviation between the center of the first jig wafer 12 and the center of the wafer chuck 17 is detected. In this embodiment, the driving device 16 is connected to the first control device 15, and is configured to control, after receiving the control signal, the first jig 122 to move the first wafer body 121, to adjust the position of the first jig wafer 12, so that the center of the first jig wafer 12 is aligned with the center of the wafer chuck 17.

The control signal may include the direction and distance that the first jig 122 needs to move.

Optionally, in an embodiment, after receiving a measurement result, the first control device 15 evaluates the deviation between the center of the first jig wafer 12 and the center of the wafer chuck 17. When the deviation is within the first preset range, the first control device 15 sends a control signal to the driving device 16 to drive the first jig 122 to move the first wafer body 121, to adjust the position of the first jig wafer 12, so that the center of the first jig wafer 12 is aligned with the center of the wafer chuck 17. When the deviation is outside the first preset range, the first control device 15 sends the measurement result to a machine control system, and the machine control system controls and adjusts the first robot to move in a horizontal direction, so that the center of the first jig wafer 12 is close to the center of the wafer chuck 17.

Optionally, in an embodiment, after the machine control system controls and adjusts the first robot to move in the horizontal direction, so that the center of the first jig wafer 12 is close to the center of the wafer chuck 17, it is also possible to reacquire the measurement result until the deviation between the center of the first jig wafer 12 and the center of the wafer chuck 17 is within the first preset range, and then the first control device 15, the driving device 16, and the first jig 122 adjust the position of the first jig wafer 12.

Continuing to refer to FIG. 2, in an embodiment, the first jig wafer 12 further includes a second distance measuring sensor 14. Optionally, the second distance measuring sensor 14 may be located on the front surface of the first wafer body 121, and is located on the outside of the first jig 122.

Figure 6:
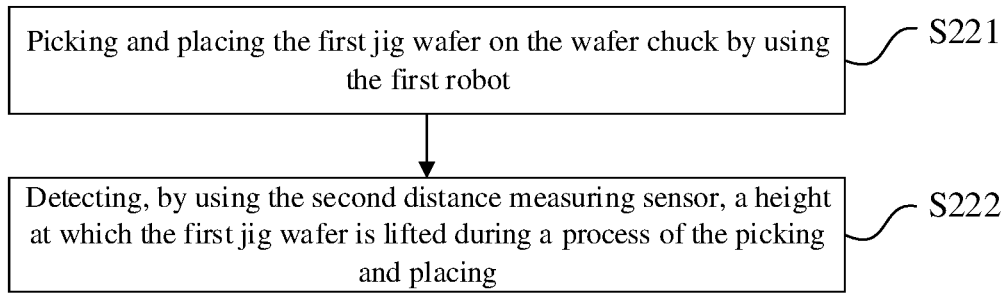
FIG. 6 is a flowchart of step S2 in a method for correcting a robot according to another embodiment of the disclosure.

Referring to FIG. 6, in an embodiment, step S2 may include steps S221 and S222.

At S221, the first jig wafer 12 is picked and placed on the wafer chuck 17 by using the first robot 11.

At S222, a height at which the first jig wafer 12 is lifted during a process of the picking and placing is detected by using the second distance measuring sensor 14.

In an embodiment, step S3 may include the following step:

comparing the detected height at which the first jig wafer 12 is lifted during the process of the picking and placing with a first target height, and when a deviation between the detected height at which the first jig wafer 12 is lifted during the process of the picking and placing and the first target height is outside a second preset range, determining that the first robot 11 needs to be corrected.

Specifically, the second distance measuring sensor 14 can be configured to detect the height at which the first jig wafer 12 is lifted when the first robot 11 controls the picking and placing of the first jig wafer 12 on the upper surface of the wafer chuck 17. In an embodiment, when the first robot picks and places the first jig wafer 12 on the upper surface of the wafer chuck 17, the second distance measuring sensor 14 can measure the distance between the top of the chamber and the second distance measuring sensor 14. By measuring a variation of the distance, the lifting height or lowering height when the first robot 11 picks and places the first jig wafer 12 can be obtained as the first height information, and the first height information can be compared with the first target height to determine whether the first robot 11 needs to be corrected.

Figure 7:
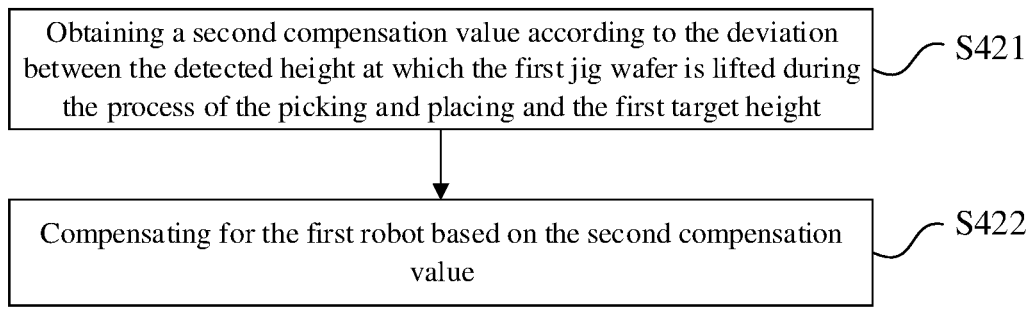
FIG. 7 and FIG. 8 are flowcharts of step S4 in a method for correcting a robot according to some embodiments of the disclosure.

Referring to FIG. 7, in an embodiment, step S4 may include the steps S421 and S422.

At S421, a second compensation value is obtained according to the deviation between the detected height at which the first jig wafer 12 is lifted during the process of the picking and placing and the first target height.

At S422, the first robot 11 is compensated based on the second compensation value.

According to the method for correcting a robot provided by the foregoing embodiments, monitoring of the lifted or lowered height of the first robot can be implemented by the second distance measuring sensor 14.

Optionally, when the first robot 11 is controlled to pick and place the first jig wafer 12, the first distance measuring sensor 13 can also acquire a height change value of the first robot 11 by measuring the distance between the center of the wafer chuck 17 and the center of the back surface of the first jig wafer 12 to obtain second height information.

According to the method for correcting a robot provided by the foregoing embodiments, the second height information can be used for verifying the first height information, so as to discover a problem in time when the second distance measuring sensor 14 malfunctions, thereby preventing the wafer from being damaged during movement due to the failure of the distance measuring sensor.

Optionally, there may be multiple second distance measuring sensors 14, and multiple second distance measuring sensors 14 may be arranged on the outside of the first jig 122 at intervals.

In an embodiment, step S2 may include the following step:

after transferring the first jig wafer 12 to the first chamber by using the first robot 11, detecting, by using the respective second distance measuring sensors 14, the distances to the top of the first chamber.

In an embodiment, step S3 may include the following step:

determining whether a distance from the respective second distance measuring sensors 14 to the top of the first chamber are same, and when the distances from the respective second distance measuring sensors 14 to the top of the first chamber are not exactly the same, determining that the first robot 11 needs to be corrected.

In the method for correcting a robot provided by the foregoing embodiments, the multiple second distance measuring sensors 14 measure linear distances to the top of the first chamber respectively. When the measurement results of all the second distance measuring sensors 14 are equal, it means that the first robot 11 is in a horizontal state. When there are multiple distance values in the measurement results of the second distance measuring sensors 14, it means that the first robot 11 is not in a horizontal state, and the first robot needs to be corrected.

Optionally, in an embodiment, the first control device 15 is further configured to determine whether the first robot 11 is in the horizontal state according to the detection results of the second distance measuring sensors 14.

Figure 8:
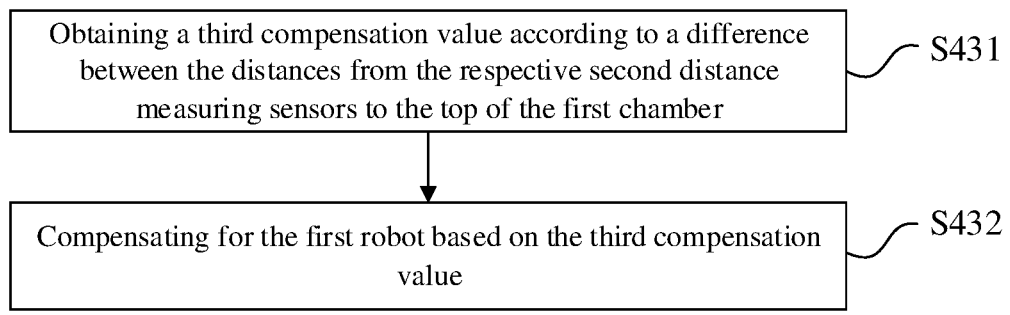

Referring to FIG. 8, in an embodiment, step S4 may include steps S431 and S432.

At S431, a third compensation value is obtained according to a difference between the distances from the respective second distance measuring sensors to the top of the first chamber.

At S432, the first robot 11 is compensated based on the third compensation value.

Figure 9:
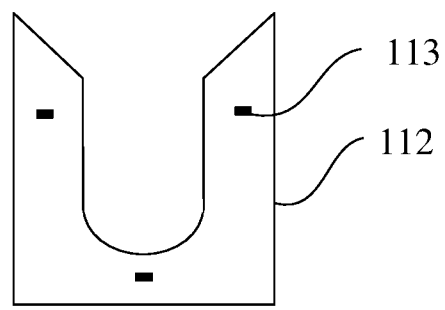
FIG. 9 is a schematic structural diagram of fingers of a first robot in a method for correcting a robot according to an embodiment of the disclosure.
Figure 10:
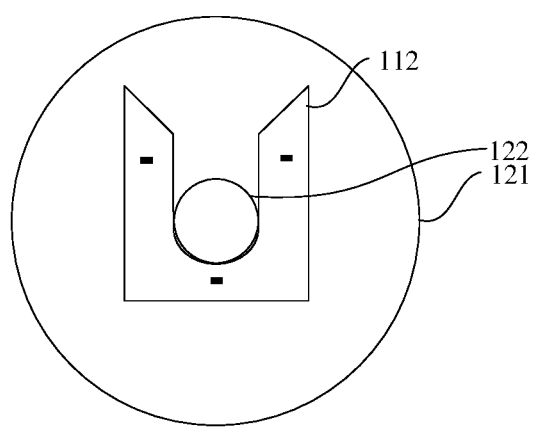
FIG. 10 is a schematic structural diagram when the fingers of a first robot clamp a first jig in a method for correcting a robot according to an embodiment of the disclosure.

Referring to FIG. 9 and FIG. 10, in an embodiment, the center of the first jig 122 coincides with the center of the first wafer body 121. The first robot 11 includes a finger robot. The finger robot includes a robot body 111 and a pair of fingers. The pair of fingers are fixed to an end of the robot body, and are arranged in parallel at an interval. The spacing between the pair of fingers of the first robot 11 is greater than or equal to the width of the first jig 122. In this embodiment, the robot body is a first robot body 111, and the fingers are first fingers 112.

Specifically, in an embodiment, the first fingers 112 may be fixedly mounted on the first robot body 111, and can move with the first robot body 111. The first fingers 112 are mainly configured to carry and move the wafer. In an embodiment, as illustrated in FIG. 8, in order to prevent the wafer from slipping off during the process of moving the wafer, vacuum suction units 113 can be provided on surfaces of the first fingers 112. The vacuum suction units 113 can be disposed to protrude out of the surfaces of the first fingers 112, and can also be disposed inside the first fingers 112, that is, the upper surfaces of the vacuum suction units 113 are aligned with the surfaces of the first fingers 112.

Optionally, as illustrated in FIG. 9, since the width of the first jig 122 is less than or equal to the spacing between the first fingers 112, when the first robot 11 is controlled to pick and place the first jig wafer 12, the position of the first robot 11 can firstly be adjusted based on the position of the first jig 122, so that the first robot 11 can clamp the first jig 122 between the first fingers 112. In an embodiment, before step S2, the method may further include the following steps:

placing the first robot above the first jig wafer 12, and determining whether the first jig 122 is stuck by the pair of fingers of the first robot; and when the first jig 122 is not stuck by the pair of fingers of the first robot, compensating for the first robot according to the deviation of the pair of fingers of the first robot relative to the first jig 122.

By first adjusting the position of the first robot 11 in this manner, it is possible to ensure that when the first robot 11 extends into the first chamber again to hold up the wafer, the first robot 11 is located at the middle of the wafer, and can thus hold up the wafer stably to avoid that the wafer is damaged by turning over after being held up.

Figure 11:
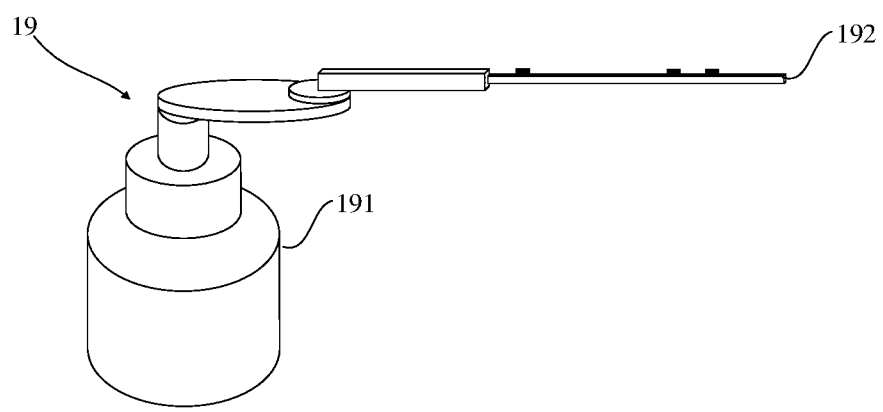
FIG. 11 is a schematic structural diagram of a second robot in a method for correcting a robot according to an embodiment of the disclosure.
Figure 12:
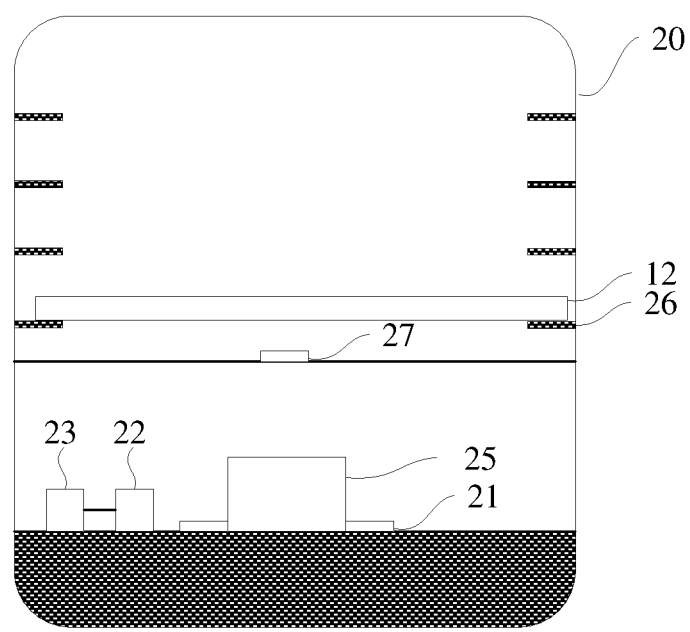
FIG. 12 is a schematic structural diagram of a jig wafer box in a method for correcting a robot according to an embodiment of the disclosure.

Referring to FIG. 11 and FIG. 12, in an embodiment, the robot further includes a second robot 19 located in a second chamber. The second chamber includes an atmospheric transmission chamber. The correction device further includes: a jig wafer box 20 and multiple third distance measuring sensors 21. The first jig wafer 12 is placed in the jig wafer box 20 before being transferred to the first chamber. The jig wafer box 20 is loaded on a loading platform of the second chamber. The multiple third distance measuring sensors 21 are located in the jig wafer box 20, disposed at intervals along the circumferential direction of the jig wafer box 20, and located below the first jig wafer 12.

With reference to FIG. 11, the second robot 19 comprises a second robot body 191 and a pair of second fingers 192. the pair of second fingers 192 are fixed to an end of the second robot body 191.

Figure 13:
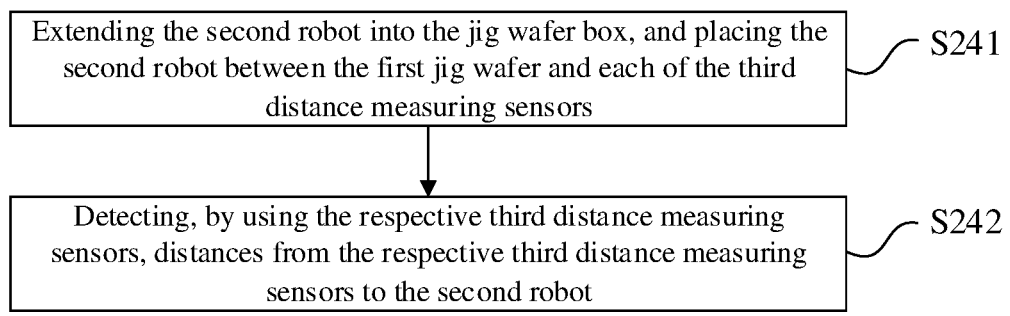
FIG. 13 is a flowchart of step S2 in a method for correcting a robot according to another embodiment of the disclosure.

Referring to FIG. 11 to FIG. 13, in an embodiment, step S2 may include steps S241 and S242.

At S241, the second robot 19 is extended into the jig wafer box, and placing the second robot 19 between the first jig wafer 12 and the respective third distance measuring sensors 21.

At S242, the distances from the respective third distance measuring sensors 21 to the second robot 19 are detected by using the respective third distance measuring sensors 21.

In an embodiment, step S3 may include the following step:

determining whether the distances from the respective third distance measuring sensors 21 to the second robot 19 are the same, when the distances from the respective third distance measuring sensors 21 to the second robot 19 are not exactly the same, determining that the second robot 19 needs to be corrected.

Optionally, as illustrated in FIG. 12, the multiple third distance measuring sensors 21 can be disposed at intervals around a second jig 25, and both the second jig 25 and the third distance measuring sensors 21 are located below the first jig wafer 12. The third distance measuring sensors 21 can be configured to detect distances from the second robot 19 to the respective third distance measuring sensors 21. When the measurement results of all the third distance measuring sensors 21 are equal, it means that the second robot 19 is in a horizontal state. When there are multiple distance values in the measurement results of the third distance measuring sensors 21, it means that the second robot 19 is not in a horizontal state, and the second robot 19 needs to be corrected.

Optionally, referring to FIG. 12 again, the second robot 19 may include a second control device 22, which is connected to the respective third distance measuring sensors 21, and is configured to determine whether the second robot 19 is in the horizontal state according to the detection results of the respective third distance measuring sensors 21.

Figure 14:
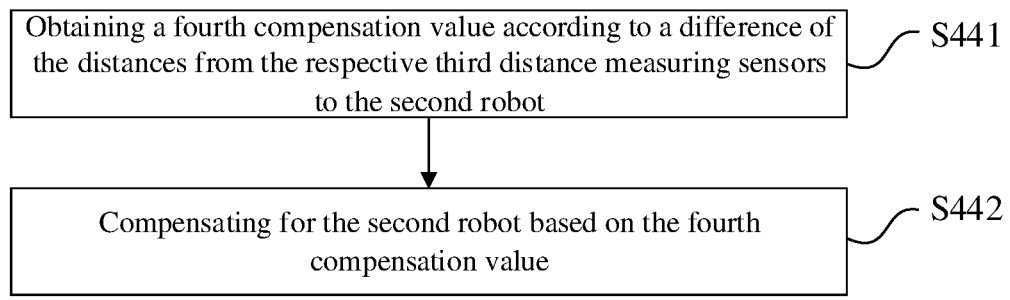
FIG. 14 is a flowchart of step S4 in a method for correcting a robot according to another embodiment of the disclosure.

Referring to FIG. 14, in an embodiment, step S4 may include steps S441 and S442.

At S441, a fourth compensation value is obtained according to a difference of the distances from the respective third distance measuring sensors 21 to the second robot 19; and At S442, the second robot 19 is compensated based on the fourth compensation value.

Referring to FIG. 12 again, in an embodiment, a wafer carrying unit 26 may be provided in the jig wafer box 20, the wafer carrying unit 26 includes a wafer slot extending along the circumferential direction of the jig wafer box 20 or wafer support blocks disposed at intervals along the circumferential direction of the jig wafer box 20, and the first jig wafer 12 is located on the wafer carrying unit 26.

The jig wafer box 20 can be configured to place the first jig wafer 12, or simultaneously place multiple wafers. Optionally, in an embodiment, multiple wafer carrying units 26 can be provided in the jig wafer box 20.

In an embodiment, multiple third distance measuring sensors 21 can be provided in the jig wafer box 20, and are disposed inside the jig wafer at intervals along the circumferential direction of the jig wafer box 20. As an example, as illustrated in FIG. 12, multiple third distance measuring sensors 21 can be disposed at intervals around a second jig 25, and both the second jig 25 and the third distance measuring sensors 21 are located below the first jig wafer 12. Specifically, the second jig 25 and the third distance measuring sensors 21 can be located at the bottom of the jig wafer box 20. The third distance measuring sensors 21 can be configured to detect distances from the second robot 19 to the respective third distance measuring sensors 21, and send the detection results to the second control device 22, so as to determine whether the second robot 19 is in the horizontal state.

Similar to the first jig 122, the second jig 25 also has the function of correcting the position of the robot.

Referring to FIG. 12, in an embodiment, the correction device may further include a fourth distance measuring sensor 27. As illustrated in FIG. 10, the fourth distance measuring sensor 27 is located in the jig wafer box 20, and is located below the first jig wafer 12. The fourth distance measuring sensor 27 can be configured to detect a height at which the wafer is lifted by the second robot 19 when transferring the wafer.

Figure 15:
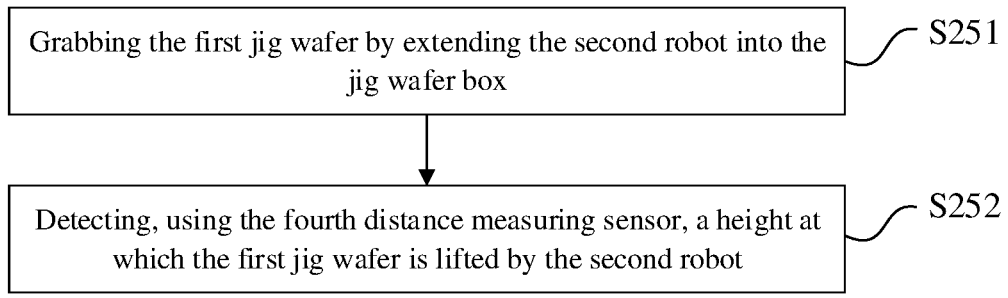
FIG. 15 is a flowchart of step S2 in a method for correcting a robot according to another embodiment of the disclosure.

Referring to FIG. 15, in an embodiment, step S2 may include steps S251 and S252.

At S251, the first jig wafer 12 is grabbed by extending the second robot 19 into the jig wafer box 20.

At S252, a height at which the first jig wafer 12 is lifted by the second robot 19 is detected by using the fourth distance measuring sensor 27.

In an embodiment, step S3 may include the following step:

comparing the height at which the first jig wafer 12 is lifted by the second robot 19 and detected by the fourth distance measuring sensor 27 with a second target height, and when a deviation between the detected height at which the first jig wafer 12 is lifted by the second robot 19 and the second target height is outside a third preset range, determining that the second robot 19 needs to be corrected.

As an example, the fourth distance measuring sensor 27 is disposed in the jig wafer box 20, and is located below the first jig wafer 12. When the second robot lifts the first jig wafer 12, the fourth distance measuring sensor 27 can measure and obtain a height variation of the first jig wafer 12, and the height variation is a lifting height of the second robot. Since the spacing between adjacent wafer carrying units 26 is a fixed value, and the distance from the wafer carrying unit 26 located at the top layer to the top of the jig wafer box 20 is a fixed value, the lifting height of the second robotic arm cannot be too large. According to the spacing between the adjacent wafer carrying units 26 or the distance from the wafer carrying unit 26 located at the top layer to the top of the jig wafer box 20, a machine control system can be controlled to adjust the lifting height of the second robot, to prevent the wafer from being damaged due to collision with other wafer carrying units 26.

Figure 16:
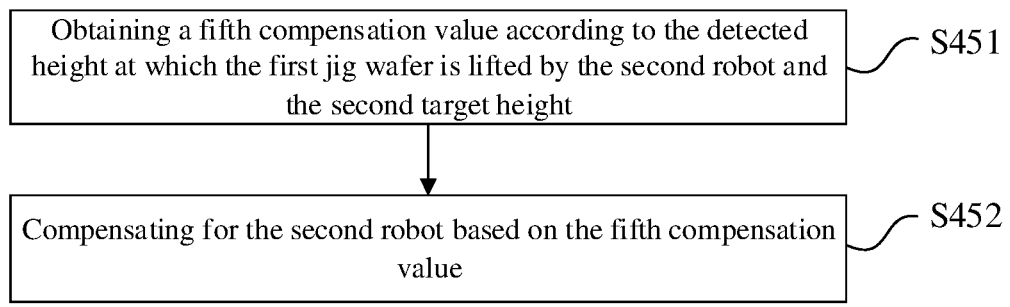
FIG. 16 is a flowchart of step S4 in a method for correcting a robot according to another embodiment of the disclosure.

Referring to FIG. 16, in an embodiment, step S4 may include steps S451 and S452.

At S451, a fifth compensation value is obtained according to the detected height at which the first jig wafer 12 is lifted by the second robot 19 and the second target height.

At S452, the second robot 19 is compensated based on the fifth compensation value.

Referring to FIG. 9, in an embodiment, the second robot may be provided with multiple vacuum suction units 113 arranged at intervals.

Figure 17:
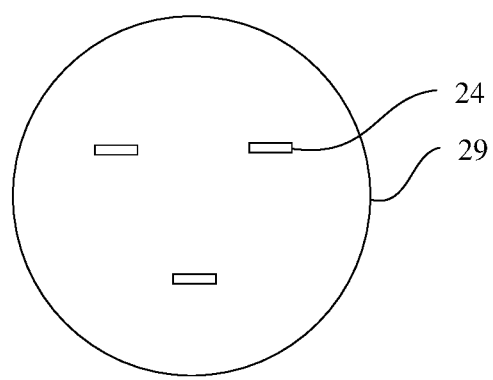
FIG. 17 is a schematic diagram of the positions of a pressure sensors disposed on a back surface of a second jig wafer in a method for correcting a robot according to an embodiment of the disclosure.

Referring to FIG. 17, in an embodiment, the correction device may further include a second jig wafer 29. The second jig wafer 29 is located in the jig wafer box 20, and below the first jig wafer 12. The second jig wafer 29 is provided with multiple pressure sensors 24, and the multiple pressure sensors 24 are arranged corresponding to the vacuum suction units 113.

Figure 18:
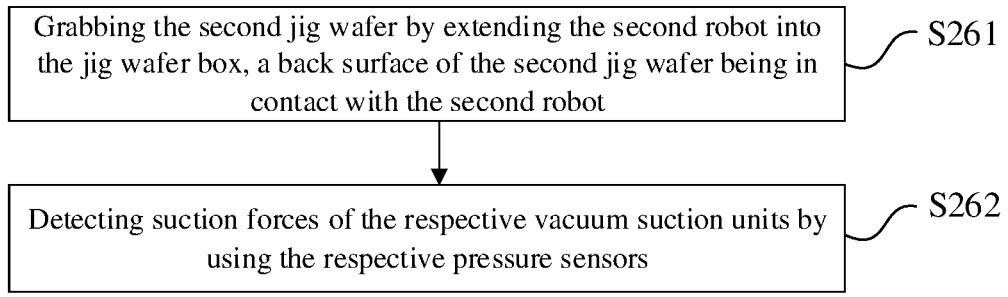
FIG. 18 is a flowchart of step S2 in a method for correcting a robot according to another embodiment of the disclosure.

Referring to FIG. 18, in an embodiment, step S2 may include steps S261 and S262.

At S261, the second jig wafer 29 is grabbed by extending the second robot 19 into the jig wafer box 20, a back surface of the second jig wafer 29 is in contact with the second robot 19.

At S262, the suction forces of the respective vacuum suction units 113 are detected by using the respective pressure sensors.

Specifically, as illustrated in FIG. 9 and FIG. 17, the back surface of the second jig wafer 29 is provided with multiple pressure sensors 24, and the second robot is provided with multiple vacuum suction units 113 disposed at intervals. The positions of multiple pressure sensors 24 are correspond to the positions of multiple vacuum suction units 113, to ensure that the pressure sensors 24 can measure the suction forces of the respective vacuum suction units 113 on the second robot arm. The vacuum suction units 113 can suck the wafer, and can thus ensure that the wafer does not slip off during the transfer process of the wafer by the robot.

According to the method for correcting a robot provided by the foregoing embodiments, by providing the pressure sensors 24 on the back surface of the second jig wafer 29, the suction forces of the respective vacuum suction units 113 on the robot can be measured in real time.

In an embodiment, step S3 may include the following step:

determining whether the suction forces of the respective vacuum suction units 113 are the same, and when the suction forces of the respective vacuum suction units 113 are not exactly the same, determining that the second robot 19 needs to be corrected.

Figure 19:
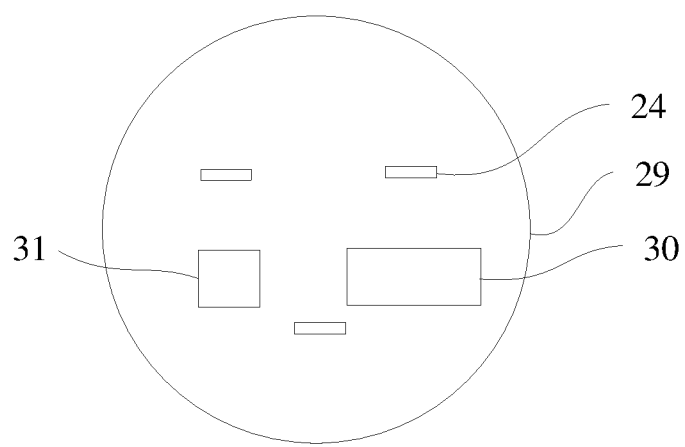
FIG. 19 is a schematic structural diagram of a second jig wafer in a method for correcting a robot according to an embodiment of the disclosure.

Optionally, as illustrated in FIG. 19, the second robot 19 may further include a third control device 30, which is connected to the respective pressure sensors 24, and is configured to determine whether the suction forces of the respective vacuum suction units 113 are the same according to the detection results of the respective pressure sensors 24.

Figure 20:
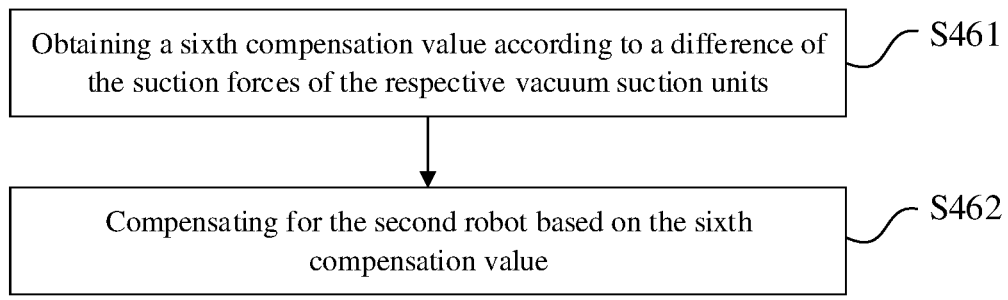
FIG. 20 is a flowchart of step S4 in a method for correcting a robot according to another embodiment of the disclosure.

Referring to FIG. 20, in an embodiment, step S4 may include steps S461 and S462.

At S461, a sixth compensation value is obtained according to a difference of the suction forces of the respective vacuum suction units 113.

At S462, the second robot 19 is compensated based on the sixth compensation value.

Optionally, there may be multiple fourth distance measuring sensors 27, and multiple fourth distance measuring sensors 27 are located below the second jig wafer 29 and between the second jig wafer 29 and the first jig wafer 12.

Figure 21:
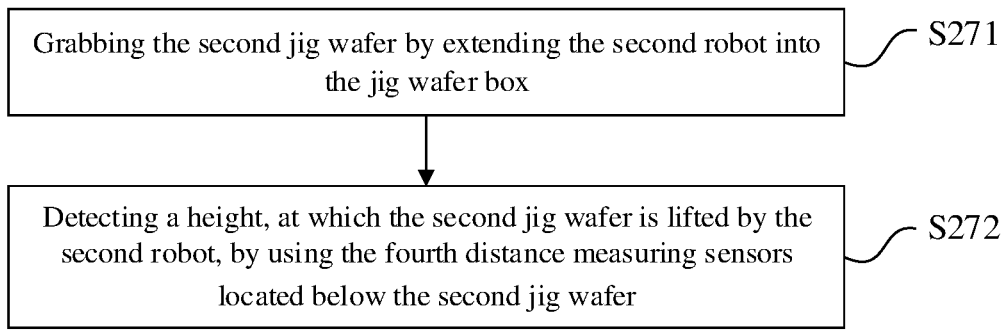
FIG. 21 is a flowchart of step S2 in a method for correcting a robot according to another embodiment of the disclosure.

Referring to FIG. 21, in an embodiment, step S2 may include steps S271 and S272.

At S271, the second jig wafer 29 is grabbed by extending the second robot 19 into the jig wafer box 20.

At S272, the height at which the second jig wafer 29 is lifted by the second robot 19 is detected by using the fourth distance measuring sensors located below the second jig wafer.

In an embodiment, step S3 may include the following step:

comparing the height at which the second jig wafer 29 is lifted by the second robot 19 and detected by the fourth distance measuring sensors 27 located below the second jig wafer 29 with a second target height, and when a deviation between the detected height at which the second jig wafer 29 is lifted by the second robot 19 and the second target height is outside a third preset range, determining that the second robot 19 needs to be corrected.

Figure 22:
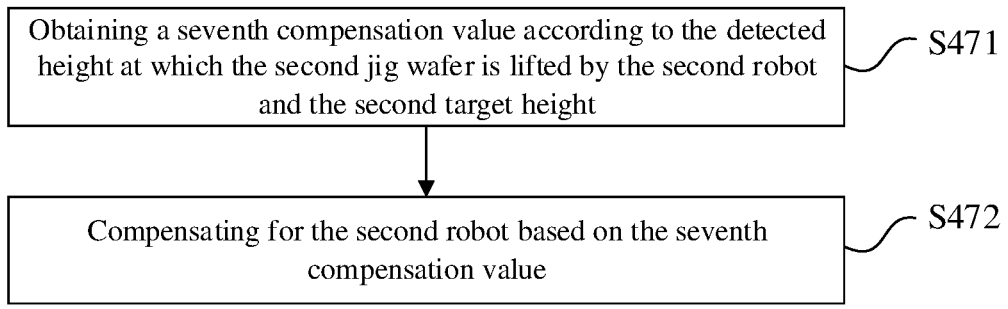
FIG. 22 is a flowchart of step S4 in a method for correcting a robot according to another embodiment of the disclosure.

Referring to FIG. 22, in an embodiment, step S4 may include steps S471 and S472.

At S471, a seventh compensation value is obtained according to the detected height at which the second jig wafer 29 is lifted by the second robot 19 and the second target height.

At S472: the second robot 19 is compensated based on the seventh compensation value.

Figure 23:
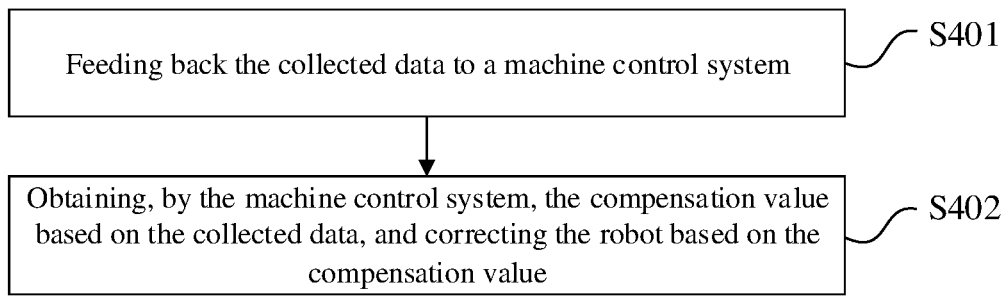
FIG. 23 is a flowchart of step S4 in a method for correcting a robot according to another embodiment of the disclosure.

Referring to FIG. 23, in an embodiment, step S4 may include steps S401 and S402.

At S401, the collected data is fed back to the machine control system.

At S402, the compensation value is obtained based on the collected data, and correcting the robot based on the compensation value by the machine control system.

In an embodiment, step S401 may include:
feeding back the collected data to the machine control system by a transmission module.

Optionally, the transmission module may be, but is not limited to, a wireless transmission module (such as a Wi-Fi module) or a wired transmission module, etc. The type of the transmission module is not limited in the disclosure.

In an embodiment, the correction device further includes a first transmission module. The first transmission module is connected to the first control device 15, and is configured to transmit the detection result of the first distance measuring sensor 13 and the detection results of the second distance measuring sensors 14 to the machine control system.

In the method for correcting a robot provided by the foregoing embodiments, the real-time measurement data of the correction device can be transmitted to the machine control system by the first transmission module for display, analysis, and processing.

In an embodiment, the correction device further includes a second transmission module 23. The second transmission module 23 is connected to the second control device 22, and is configured to transmit the determination result of the second control device 22 to the machine control system.

Optionally, in other embodiments, the second transmission module 23 can also transmit the data actually measured by the respective third distance measuring sensors 21 to the machine control system, so that the machine control system adjusts the state of the second robot 19 to a horizontal state according to the detection data.

Referring to FIG. 19, in an embodiment, the correction device further includes a third transmission module 31, which is connected to the third control device 30, and is configured to transmit the determination result of the third control device 30 to the machine control system.

The third transmission module 31 can send the determination result of the third control device 30 to the machine control system, so that the machine control system adjusts the suction forces of the vacuum suction units 113. Optionally, the third transmission module 31 can also send suction force data measured by the respective pressure sensors 24 to the machine control system, so that the machine control system adjusts suction force values more precisely.

In an embodiment, the fourth distance measuring sensors 27 are connected to the second transmission module 23, and the second transmission module 23 is further configured to transmit the detection results of the fourth distance measuring sensors 27 to the machine control system.

In an embodiment, the transmission module may further be configured to feed back the collected data to the machine control system for storage. Optionally, after the machine control system obtains the compensation value based on the collected data, the machine control system further stores the compensation value.

In an embodiment, the first transmission module is further configured to transmit the detection result of the first distance measuring sensor 13 and the detection results of the second distance measuring sensors 14 to the machine control system for storage.

In an embodiment, the second transmission module 23 is further configured to transmit the detection results of the third distance measuring sensors 21 and the detection results of the fourth distance measuring sensors 27 to the machine control system for storage.

In an embodiment, the third transmission module 31 is further configured to transmit the detection results of the respective pressure sensors 24 to the machine control system for storage.

In another embodiment, the machine control system is further configured to compare the compensation value obtained based on the current collected data with a compensation value already stored in the machine control system.

In an embodiment, the machine control system can calibrate other robots by using the stored detection results, including parameters such as the heights and horizontal positions of the robots during the wafer transfer process.

Certainly, in other examples, the correction device may include a processing device independent of the machine control system. The processing device is configured to receive the collected data, obtain a compensation value according to the collected data when the robot needs to be corrected, and feed back the compensation value to the machine control system.

It is to be understood that, although the respective steps of the flowcharts in FIG. 1, FIG. 3, FIG. 5 to FIG. 8, FIG. 13 to FIG. 16, FIG. 18, and FIG. 20 to FIG. 23 are displayed sequentially according to arrows, the respective steps are not necessarily performed according to an order indicated by the arrows. Unless otherwise explicitly specified in the disclosure, execution of these steps is not strictly limited, and the steps may be performed in other orders. Moreover, at least some of the steps in FIG. 1, FIG. 3, FIG. 5 to FIG. 8, FIG. 13 to FIG. 16, FIG. 18, and FIG. 20 to FIG. 23 may include a plurality of steps or a plurality of stages. These steps or stages are not necessarily executed at the same time, but can be executed at different times. The order of execution of these steps or stages is not necessarily performed sequentially, but may be performed in turn or alternately with other steps or at least some of steps or stages of other steps.

Technical features of the foregoing embodiments may be randomly combined. To make description concise, not all possible combinations of the technical features in the foregoing embodiments are described. However, the combinations of these technical features without conflict shall be considered as falling within the scope of this description.

The foregoing embodiments only describe several implementations of this disclosure specifically and in detail, but cannot be construed as a limitation to the patent scope of this disclosure. It is to be noted that for a person of ordinary skilled in the art, several modifications and improvements can be made without departing from the concept of the disclosure. These modifications and improvements belong to the protection scope of the disclosure. Therefore, the protection scope of the patent of this disclosure shall be subject to the appended claims.

The invention claimed is:

1. A method for correcting a robot, comprising:
providing a robot to be corrected, wherein the robot comprises a first robot located in a first chamber;
providing a correction device, wherein the correction device comprises a jig wafer comprising a first jig wafer; wherein the first jig wafer comprises a first wafer body, a first jig, and a first distance measuring sensor; the first jig is located on a front surface of the first wafer body, and the first distance measuring sensor is located at a central position of a back surface of the first wafer body;
transferring the first jig wafer onto ejector pins raised at a wafer chuck in the first chamber by using the first robot;
detecting a distance from a center of the first wafer body to an edge ring arranged on an edge of the wafer chuck by using the first distance measuring sensor facing the wafer chuck to obtain a collected data;
comparing the distance detected from the center of the first wafer body to the edge ring arranged on the edge of the wafer chuck with a target distance, and when a deviation between the distance detected and the target distance is outside a first preset range, determining that the first robot needs to be corrected;
obtaining a first compensation value according to the deviation between the distance detected from the center of the first wafer body to the edge ring arranged on the edge of the wafer chuck and the target distance; and
compensating for the first robot based on the first compensation value to correct the first robot.

2. The method for correcting the robot of claim 1, wherein the first jig wafer further comprises a driving device; and wherein
when the deviation is within the first preset range, the driving device drives the first jig to move the first wafer body to adjust the center of the first jig wafer is aligned with the center of the wafer chuck;
when the deviation is outside the first preset range, the first robot is moved in a horizontal direction to adjust the center of the first jig wafer is close to the center of the wafer chuck.

3. The method for correcting the robot of claim 1, wherein the first jig wafer further comprises a second distance measuring sensor, and the second distance measuring sensor is located on the front surface of the first wafer body, and is located on outside of the first jig;
wherein the method further comprises:
picking and placing the first jig wafer on the wafer chuck by using the first robot; and
detecting, by using the second distance measuring sensor, a height at which the first jig wafer is lifted during a process of the picking and placing,
comparing the detected height at which the first jig wafer is lifted during the process of the picking and placing with a first target height, and when a deviation between the detected height at which the first jig wafer is lifted during the process of the picking and placing and the first target height is outside a second preset range, determining that the first robot needs to be corrected,
obtaining a second compensation value according to the deviation between the detected height at which the first jig wafer is lifted during the process of the picking and placing and the first target height; and
compensating for the first robot based on the second compensation value.

4. The method for correcting the robot of claim 3, wherein there is a plurality of second distance measuring sensors, and the plurality of second distance measuring sensors are arranged on the outside of the first jig at intervals;
wherein the method further comprises:
after transferring the first jig wafer to the first chamber by using the first robot, detecting, by using respective second distance measuring sensors of the plurality of second distance measuring sensors, distances from the respective second distance measuring sensors to top of the first chamber,
determining whether the distances from the respective second distance measuring sensors to the top of the first chamber are same, and when the distances from the respective second distance measuring sensors to the top of the first chamber are not same, determining that the first robot needs to be corrected,
obtaining a third compensation value according to a difference between the distances from the respective second distance measuring sensors to the top of the first chamber; and
compensating for the first robot based on the third compensation value.

5. The method for correcting the robot of claim 1, wherein a center of the first jig coincides with the center of the first wafer body; the first robot comprises a finger robot; the finger robot comprises a robot body and a pair of fingers; the pair of fingers are fixed to an end of the robot body, and are arranged in parallel at an interval; a spacing between the pair of fingers of the first robot is greater than or equal to a width of the first jig; and before the step of transferring the first jig wafer onto ejector pins raised at a wafer chuck in the first chamber by using the first robot, the method further comprises:
placing the first robot above the first jig wafer, and determining whether the first jig is stuck by the pair of fingers of the first robot; and
when the first jig is not stuck by the pair of fingers of the first robot, compensating for the first robot according to a deviation of the pair of fingers of the first robot relative to the first jig.

6. The method for correcting the robot of claim 1, wherein the wafer chuck comprises an electrostatic chuck or a vacuum chuck, and the first chamber comprises at least one of: an atmospheric transmission chamber, a vacuum chamber, an airlock chamber, a buffer chamber, a cooling chamber, or a process chamber.

7. The method for correcting the robot of claim 1, wherein the robot further comprises a second robot located in a second chamber, and the second chamber comprises an atmospheric transmission chamber; the correction device further comprises: a jig wafer box and a plurality of third distance measuring sensors; the first jig wafer is placed in the jig wafer box before being transferred to the first chamber; the jig wafer box is loaded on a loading platform of the second chamber; and the plurality of third distance measuring sensors are located in the jig wafer box, disposed at intervals along a circumferential direction of the jig wafer box, and located below the first jig wafer;
wherein the method further comprises:
extending the second robot into the jig wafer box, and placing the second robot between the first jig wafer and respective third distance measuring sensors of the plurality of third distance measuring sensors; and
detecting, by using the respective third distance measuring sensors, distances from the respective third distance measuring sensors to the second robot,
determining whether the distances from the respective third distance measuring sensors to the second robot are same, and when the distances from the respective third distance measuring sensors to the second robot are not same, determining that the second robot needs to be corrected,
obtaining a fourth compensation value according to a difference of the distances from the respective third distance measuring sensors to the second robot; and
compensating for the second robot based on the fourth compensation value to correct the second robot.

8. The method for correcting the robot of claim 7, wherein a wafer carrying unit is provided in the jig wafer box, the wafer carrying unit comprises a wafer slot extending along the circumferential direction of the jig wafer box or wafer support blocks disposed at intervals along the circumferential direction of the jig wafer box, and the first jig wafer is located on the wafer carrying unit; the correction device further comprises a fourth distance measuring sensor, and the fourth distance measuring sensor is located in the jig wafer box, and below the first jig wafer;
wherein the method further comprises:
grabbing the first jig wafer by extending the second robot into the jig wafer box; and
detecting, using the fourth distance measuring sensor, a height at which the first jig wafer is lifted by the second robot,
comparing the height at which the first jig wafer is lifted by the second robot and detected by the fourth distance measuring sensor with a second target height, and when a deviation between the detected height at which the first jig wafer is lifted by the second robot and the second target height is outside a third preset range, determining that the second robot needs to be corrected,
obtaining a fifth compensation value according to the detected height at which the first jig wafer is lifted by the second robot and the second target height; and
compensating for the second robot based on the fifth compensation value.

9. The method for correcting the robot of claim 8, wherein the second robot is provided with a plurality of vacuum suction units arranged at intervals; the correction device further comprises a second jig wafer; the second jig wafer is located in the jig wafer box, and below the first jig wafer; the second jig wafer is provided with a plurality of pressure sensors, and the plurality of pressure sensors are arranged corresponding to the plurality of vacuum suction units;
wherein the method further comprises:
grabbing the second jig wafer by extending the second robot into the jig wafer box, a back surface of the second jig wafer being in contact with the second robot; and
detecting suction forces of respective vacuum suction units of the plurality of vacuum suction units by using respective pressure sensors of the plurality of pressure sensors,
determining whether the suction forces of the respective vacuum suction units are same, and when the suction forces of the respective vacuum suction units are not same, determining that the second robot needs to be corrected,
obtaining a sixth compensation value according to a difference of the suction forces of the respective vacuum suction units; and
compensating for the second robot based on the sixth compensation value.

10. The method for correcting the robot of claim 9, wherein there is a plurality of fourth distance measuring sensors, and the plurality of fourth distance measuring sensors are located below the second jig wafer and between the second jig wafer and the first jig wafer;
wherein the method further comprises:
grabbing the second jig wafer by extending the second robot into the jig wafer box; and
detecting a height, at which the second jig wafer is lifted by the second robot, by using the plurality of fourth distance measuring sensors located below the second jig wafer,
comparing the height at which the second jig wafer is lifted by the second robot and detected by the plurality of fourth distance measuring sensors located below the second jig wafer with the second target height, and when a deviation between the detected height at which the second jig wafer is lifted by the second robot and the second target height is outside the third preset range, determining that the second robot needs to be corrected,
obtaining a seventh compensation value according to the detected height at which the second jig wafer is lifted by the second robot and the second target height; and
compensating for the second robot based on the seventh compensation value.

11. The method for correcting the robot of claim 1, wherein
feeding back the collected data to a machine control system; and obtaining, by the machine control system, the compensation value based on the collected data, and correcting the robot based on the compensation value.

12. The method for correcting the robot of claim 11, wherein feeding back the collected data to the machine control system comprises: feeding back the collected data to the machine control system by a transmission module.

13. The method for correcting the robot of claim 12, wherein the transmission module comprises a wireless transmission module.

14. The method for correcting the robot of claim 12, wherein the transmission module is further configured to feed back the collected data to the machine control system for storage, and the machine control system further stores the compensation value.

15. The method for correcting the robot of claim 14, wherein the machine control system is further configured to compare the compensation value obtained based on the collected data with a compensation value stored in the machine control system.

* * * * *